2 Sheets—Sheet 1.

J. T. WRIGHT & M. SCHNEBLE.

PISTON-PACKING.

No. 7,528. Reissued Feb. 20, 1877.

WITNESSES

Villette Anderson

F. J. Mason

INVENTOR

John T. Wright,

Martin Schneble, by E. W. Anderson

ATTORNEY

2 Sheets—Sheet 2.

J. T. WRIGHT & M. SCHNEBLE.

PISTON-PACKING.

No. 7,528. Reissued Feb. 20, 1877.

WITNESSES
Villette Anderson
F. J. Klasi

INVENTOR
John T. Wright
Martin Schneble,
by E. W. Anderson,
ATTORNEY

UNITED STATES PATENT OFFICE.

JOHN T. WRIGHT AND MARTIN SCHNEBLE, OF DAYTON, OHIO.

IMPROVEMENT IN PISTON-PACKINGS.

Specification forming part of Letters Patent No. 157,666, dated December 8, 1874; reissue No. 7,528, dated February 20, 1877; application filed June 17, 1876.

*To all whom it may concern:*

Be it known that we, JOHN TOLBERT WRIGHT and MARTIN SCHNEBLE, of Dayton, in the county of Montgomery and State of Ohio, have invented a new and valuable Improvement in Piston-Packing; and we do hereby declare that the following is a full, clear, and exact description of the construction and operation of the same, reference being had to the annexed drawings making a part of this specification, and to the letters and figures of reference marked thereon.

Figure 1:
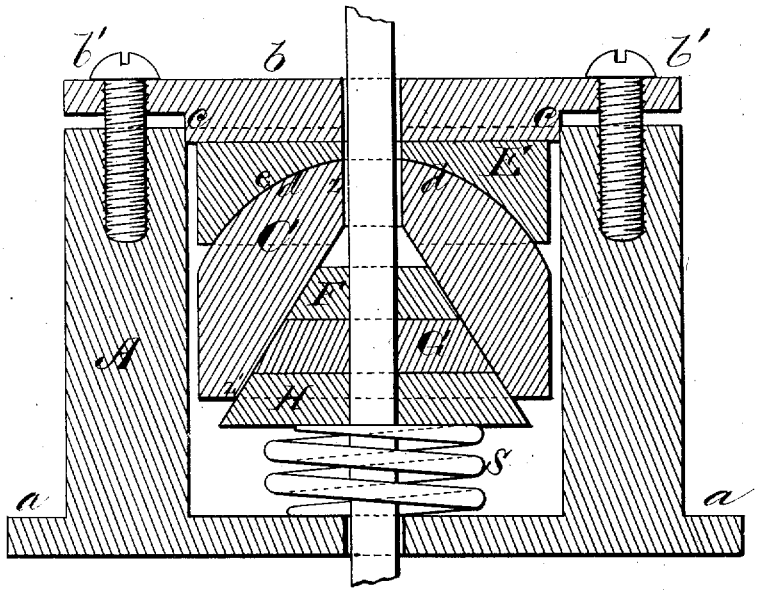
Figure 2:
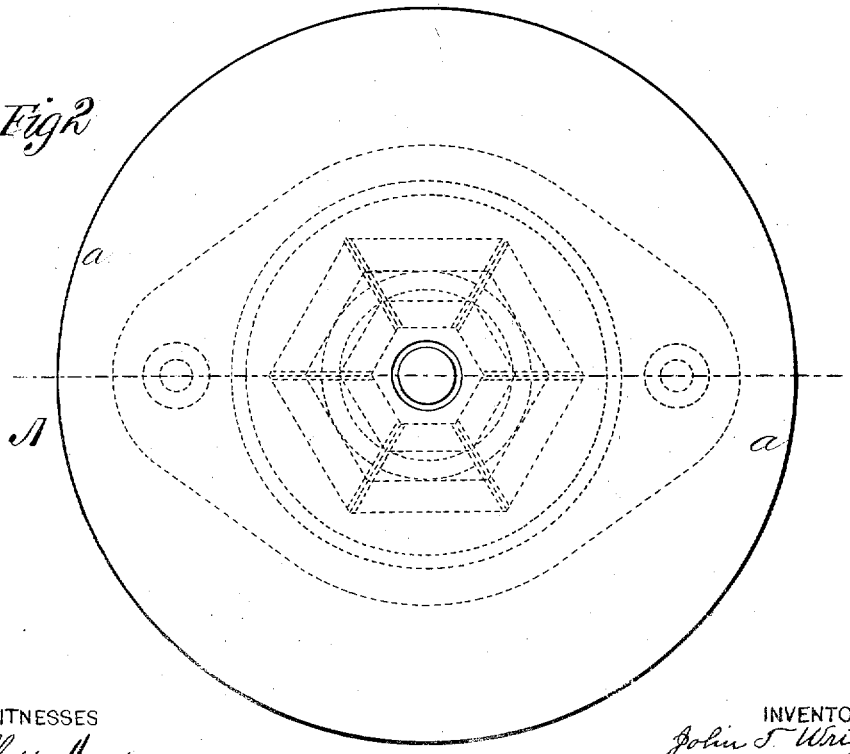
Figure 3:
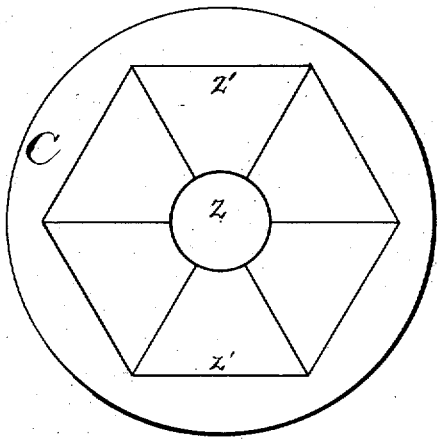
Figure 4:
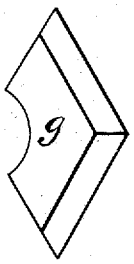
Figure 5:
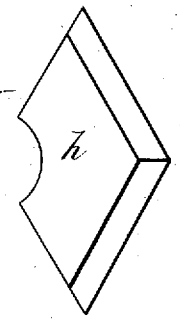

Figure 2 of the drawings is a representation of a rear view of the boxing or incasement of the packing. Fig. 1 is an axial section through the line *x x*. Figs. 3, 4, 5, 6, 7, and 8 are detail views of the packing-ring box, its concave collar, and the packing-rings.

The object of this invention is to provide a self-adjusting packing for the piston-rods of steam-engines; and it consists in the construction and novel arrangement of a packing-box of sufficient size to encircle the rod and to contain within a tapering chamber, of tapering or wedge form, around the rod, sectional packing-rings, of tapering or wedge form, and having a spherically-convex end; in the novel formation of segmental packing-rings of pyramidal form; in the spherically-concave socket-plate into which the convex end of the packing-box fits, permitting the latter to have the universal motion of a ball-and-socket joint; and in the combination, with a sectional packing ring or rings, of a rocking bearing at one end and a spring or elastic bearing at the other end of the box in which the packing-rings are arranged to work, as hereinafter fully shown and described.

In the annexed drawings, the letter A designates the stuffing-box of the cylinder of a steam-engine, to which our invention is represented as being applied. This stuffing-box is represented as having a flange, *a*, for the purpose of securing it to the cylinder-head, and a plate, *b*, by means of which the packing is confined within the stuffing-box around the piston-rod. The plate *b* may be secured to the stuffing-box by means of screws *b'* and suitable screw-threaded perforations in the plate and box, and it is usually provided with a shoulder, *c*, for the purpose of relieving the screws of lateral strain. C designates the packing-ring box, having a convex spherically-rounded head or end, *d*, which is ground to fit accurately into the concavo-spherical depression *e* of the socket-plate E. This plate E and the packing-box C are provided with central apertures for the passage of the piston-rod, the openings being slightly greater in diameter than the said piston-rod, for the purpose of allowing it a degree of lateral play. The packing-box C is provided with an interior cavity extending from the piston-rod opening *z* at one end to a wide mouth, *z'*, at the other end, the enlargement being gradual, so that the hollow is tapering or gradually increasing in form. Within this chamber, around the piston-rod, a number of packing-rings, F G H, are applied, the upper and lower or base surfaces of which are ground plane and true to fit accurately the one upon the other, and the interior and exterior surfaces to conform precisely to the shape of the piston-rods and packing-box—that is to say, when the rings are placed together their eyes will form a cylindrical passage for the rod, and their exterior surfaces will form a frustum fitting closely within the cavity of the packing-box. The base of the frustum may be hexagonal, as shown in the drawings, Fig. 6, or of any other polygonal shape which I may elect.

Figure 6:
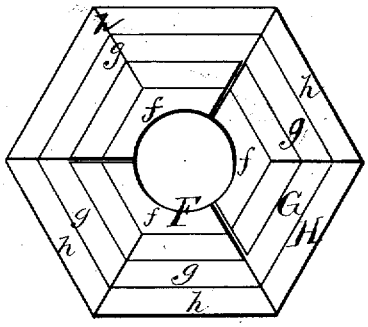
Figure 7:
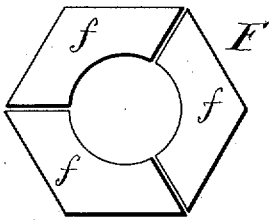
Figure 8:
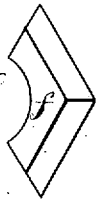

The layers or packing-rings are, respectively, composed of segments *f g h*, which, when applied around the piston-rod B, will leave a slight space between the various segments, as shown in the case of the segments for layer F in Figs. 6 and 7, so that as the interior faces are worn away by the action of the rod the segments will approach nearer to each other, penetrating farther into the chamber of the packing-box, and taking up the waste, thereby preserving and maintaining a steam-tight joint. The layers F G H are held in place by the spring-bearing S, which is caused to press against the packing by the position of the plate *b* and its pressure upon the socket-plate and packing-box, when said plate *b* is secured to the stuffing-box.

While the spring S is not of absolute necessity when the engine is in operation, its function being in a measure served by steam escaping from the cylinder into the hollow of the stuffing-box, it is indispensable when the engine is at rest and the cylinder empty of steam, or when the cylinder is in an upright position, as in walking-beam marine-engines. The spring-bearing S accommodates itself readily to any slight rocking movement of the packing-box on its bearing caused by any lateral deviation of the rod. Therefore the packing-box and its rings are allowed to move in any direction that the piston or valve rods, through wear in the cross-heads or lost motion in any part of the machinery connected therewith, may cause them to take out of true line, at the same time remaining steam-tight.

The segments *f g h* of the layers F G H are placed within the chamber of the packing-box C in the following order and in the following manner, viz: The smallest segments *f* are first placed in the chamber around the rod; then the segments *g* are arranged in like manner, breaking joints with the former; and then the segments *h* are similarly applied, breaking joints with those of the layer G. The angles of pyramidal segments being received within the angles of the chamber, the various layers are held against relative displacement, and the spaces between the adjacent ends of the segments of each layer are prevented from revolving about the piston-rod to assume a position in the same line, thus allowing the escape of steam, and rendering the packing ineffective. The segments may be of Babbitt metal, iron, composition-steel, or any other metal or composition thereof.

We are well aware that conical segmental metallic packing-layers are not new, and that these layers have been arranged in packing-boxes. Hence we do not claim such devices, broadly.

What we claim, and desire to secure by Letters Patent, is—

1. The packing F G H, of the form of a pyramidal frustum, composed of segments *f g h*, applied around the rod, breaking joints with each other, and leaving a slight space between the ends of the segments, substantially as specified.

2. The combination, with a packing-box having a pyramidal chamber and a spherically-rounded end, *d*, of the packing F G H and the spherically-concave socket-plate E, substantially as specified.

3. The combination, with a packing-box having a central rod-opening expanding in wedge form toward the steam side and a spherically-rounded end, *d*, of a plano-concave socket-plate having through the central thin portion an opening slightly larger than the rod, adapted to receive the spherical end of the packing-box, substantially as specified.

4. The combination, with a sectional packing ring or rings, of a rocking bearing at one end and an elastic and yielding bearing at the other end of the box or case, in which the packing-rings are arranged to work, substantially as specified.

In testimony that we claim the above we have hereunto set our hands in the presence of two witnesses.

JOHN T. WRIGHT.
MARTIN SCHNEBLE.

Witnesses:
GEO. H. EARL,
EDWIN W. BROWN,
A. V. SCHAEFFER,
T. M. LEWIS.